United States Patent [19]

Frister

[11] Patent Number: 4,972,114
[45] Date of Patent: Nov. 20, 1990

[54] ALTERNATING-CURRENT GENERATOR WITH CLAW POLE ROTOR

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 415,250
[22] PCT Filed: Feb. 3, 1988
[86] PCT No.: PCT/DE88/00051
 § 371 Date: Jul. 19, 1989
 § 102(e) Date: Jul. 19, 1989
[87] PCT Pub. No.: WO88/06367
 PCT Pub. Date: Aug. 25, 1988

[30] Foreign Application Priority Data
 Feb. 11, 1987 [DE] Fed. Rep. of Germany ....... 3704156

[51] Int. Cl.$^5$ ............................................. H02K 1/22
[52] U.S. Cl. ...................................... 310/263; 310/89
[58] Field of Search ................. 310/263, 68 D, 51, 62, 310/89

[56] References Cited

U.S. PATENT DOCUMENTS

| 3,004,181 | 10/1961 | Noddin | 310/263 |
| 3,184,625 | 5/1965 | Farison | 310/59 |
| 3,271,606 | 9/1966 | Collins | 310/263 |
| 3,714,484 | 1/1973 | Habert | 310/263 |
| 4,201,930 | 5/1980 | Inagaki | 310/263 |
| 4,716,485 | 10/1986 | Nakamura | 310/263 |

FOREIGN PATENT DOCUMENTS

| 1304822 | 8/1962 | France . | |
| 2256572 | 7/1975 | France . | |
| 0692003 | 10/1979 | U.S.S.R. | 310/263 |
| 2032707 | 5/1980 | United Kingdom | 310/263 |

Primary Examiner—R. Skudy
Attorney, Agent, or Firm—Michael J. Striker

[57] ABSTRACT

An alternating current generator comprising a stator, and a claw pole rotor coaxially arranged in a stator hole and including a plurality of claw pole pairs uniformly distributed on a circumference thereof and having outer surfaces forming an annular gap with a stator surface defining the stator hole, each outer surface having, in a direction of claw pole rotor rotation, a front area and a rear edge and a plurality of surface portions extending between the front area and the rear edge transverse to the rotational plane of the claw pole rotor, with a surface portion located closer to the rear edge forming with a tangent extending to the outer surface at a point where the air gap is smallest, a first angle which is greater than a second angle formed with the tangent by a surface portion located farther away from the rear edge.

8 Claims, 2 Drawing Sheets

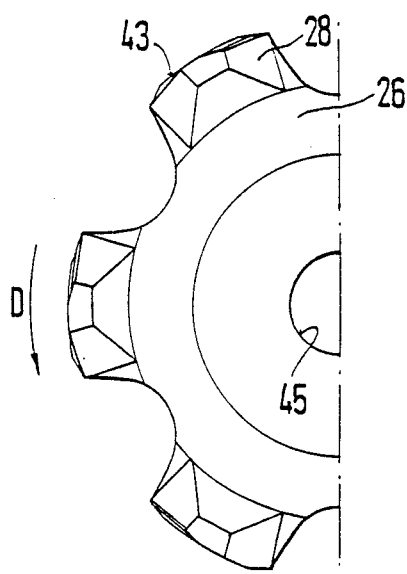
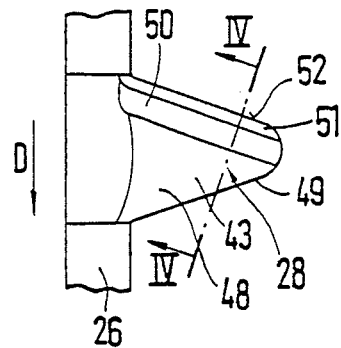
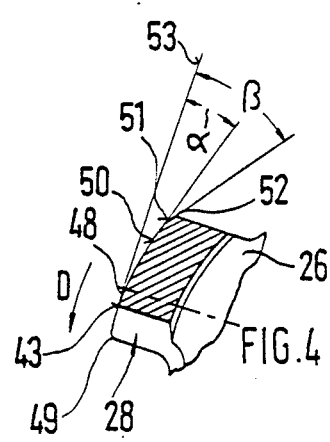
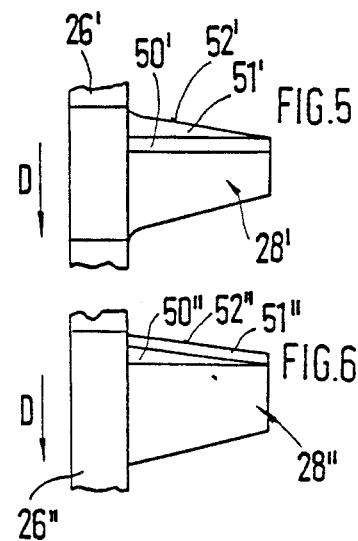

ALTERNATING-CURRENT GENERATOR WITH CLAW POLE ROTOR

The invention relates to an alternating-current generator. Such an alternating-current generator is already known from U.S. Pat. No. 3,271,606. The claw poles described in this document, have an outer surface which exhibits an air gap which is increasingly larger towards its rear edge with respect to the stator hole. Such claw poles cause a reduction in magnetic noise in comparison with other known claw poles having a constant air gap, without, however, causing a signficant loss in magnetic flux.

From U.S. Pat. No. 3,714,484, claw poles are also already known in which—seen in the direction of rotation of the claw pole rotor—the rear area of the outer surface of each claw pole is provided as an area which is rotated in itself; this design of the claw poles is intended to produce a compromise between noise reduction and energy loss of the generator.

In both the above examples, the production of the special shape of the claw poles is expensive due to high tooling costs.

SUMMARY OF THE INVENTION

The object of the invention is to provide an alternating-current genertor having such a claw pole rotor in which the generation of magnetic noise is further reduced due to optimised shaping of the claw poles but without exchanging this for increased energy losses of the alternating-current generator cycle; in addition, the claw poles should be inexpensive to produce.

According to the invention, this object is achieved by providing an alternating-current generator in which the outer surfaces of the claw poles have two or three plane areas which extend from the claw pole front area to the rear edge of the claw pole transversely to the direction of rotation of the claw pole rotor. The plane area arranged closer to the rear edge forms a greater angle of inclination with a tangent located on the outer surface of the respective claw-pole in the area of the narrowest air gap thereof, than the plane area in front of it in the direction of the claw-pole.

The present invention both as to its construction so to its mode of operation, together with additional objects and advantages thereof, will be best understood from the following description of the preferred embodiments with reference to the accompanying drawings.

BRIEF DESCRIPTION OF THE DRAWINGS

FIG. 2 according to the invention shows a part view of a pole wheel of a claw pole rotor from the claw pole side, FIG. 3 shows a top view of an outer surface of a claw pole, FIG. 4 shows a cross-sectional view through the claw pole along line IV—IV in FIG. 3 and FIGS. 5 and 6 show top views of the outer surface of claw poles of different configuration in accordance with the invention.

DESCRIPTION OF THE PREFERRED EMBODIMENTS

Figure 1:
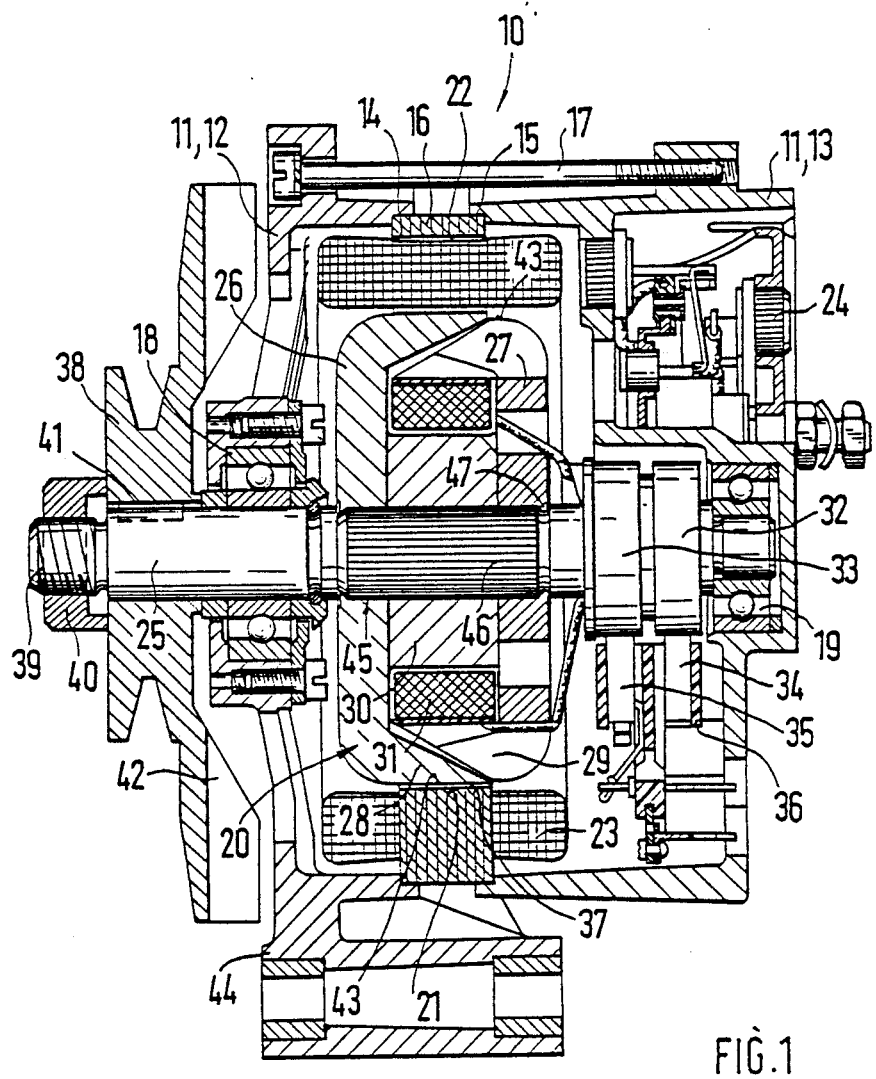
FIG. 1 shows a cross-sectional view of an alternating-current generator.

The alternating-current generator 10 shown in FIG. 1 is a compact three-phase generator according to the invention, such as is currently installed in most motor vehicles. However, the application of the subject matter of the invention is not restricted to compact three-phase generators but is generally applicable to alternating-current generators having claw pole rotors.

This alternating-current genertor 10 has as metallic casing 11 formed by two cup-shaped end shields 12 and 13, between the open front areas 14 and 15 of which a stator 16 is clamped. Stud bolts fixed in the two end shields 12 and 13 are used as clamping elements 17 for connecting the two end shields 12 and 13 to the stator 16. The end shields 12 and 13 in each case contain a ball bearing 18 and 19, respectively, for rotatably accommodating a claw pole rotor 20. The stator 16 is composed of mutually insulated sheets (laminations) which consist of magnetizable iron and are compressed to form a solid stack of laminations. The essentially annular stator 16 is provided with slots 22 in its stator hole 21 for accommodating alternating-current windings 23. In this three-phase generator 10, the alternating-current windings 23 are three wave-like windings which are spatially offset by 120 degrees and which, when the alternating-current generator is operated, deliver a three-phase useful generator current to an indicated rectifier 24 attached to the alternating-current generator 10. The rectifier 24 transforms the 3-phase current into direct current.

The claw pole rotor 20 is essentially composed of a rotor shaft 25 which is rotatably accommodated in the ball bearings 18 and 19, two pole wheels 26 and 27, which are fixed to this rotor shaft 25 at a distance from one another, with their claw poles 28 and 29, respectively. A pole core 30 of magnetizable material is arranged between the two pole wheels 26 and 27 and is also pushed onto the rotor shaft 25. An exciter winding 31 which is wound onto the pole core 30 and is enclosed by the two pole wheels 26 and 27 and the claw poles 28 and 29 which extend almost in parallel with the rotor shaft 25. In addition, two slip rings 32, 33, are fixed to the rotor shaft 25 adjacent to one another at a distance and are electrically connected to one end each of the exciter winding 31. Spring-loaded collector brushes 34 and 35 each, carried in a common brush holder 36, which supply the exciter current to exciter winding 31 rotating together with the claw pole rotor 20, press onto the two slip rings 32 and 33, the brush holder 36, which consists of plastic, is fixed to the end shield 13. The greater the exciter current and the greater the speed of rotation of the claw pole rotor 20, the higher the voltage generated in the three-phase generator. The exciter current supplied to the exciter winding 31 is dimensioned by a voltage regulator (not shown), which in most cases is attached to the alternating-current generator 10, in such a manner that the generator voltage remains constant over the entire range of rotational speed of the alternating-current generator and of the relevant vehicle engine (not shown), independently of loading and speed of rotation.

The claw pole rotor 20 preferably has, at each of its two pole wheels 26 and 27, six claw poles 28 and 29 which mesh with one another in the manner of fingers but with an insulating distance from one another. One claw pole 28 of the pole wheel 26 and an adjacently located claw pole 29 of the pole wheel 27 jointly form a claw pole pair 28/29: the two claw poles 28 and 29 have different polarities and produce a magnetic field. When the claw pole rotor 20 rotates, such magnetic fields generate the useful electric current of the alternating-current generator 10 in the alternating-current windings 23. The air gap located between the claw poles 28 and 29 and the stator hole 21, is designated by a reference numeral 37.

Outside the casing 11 of the alternating-current generator 10, a belt pulley 38, which is used for driving the alternating-current generator 10, is arranged on the rotor shaft 25, fixed with a nut 40 screwed onto a threaded stud 39 of the rotor shaft 25, and is secured against rotation by a feather key 41. The belt pulley 38 in this arrangement forms one component with a fan 42 which provides for cooling air to be moved through the alternating-current generator 10; alternatively, the fan 42 can also be a separate component which can be arranged as outside 30 inside the metallic casing 11.

To attach the alternating-current generator 10 to the motor vehicle engine, the drive-side end shield 12 is provided with a hinged arm 44. A second mounting means suitable for accurately fixing the alternating-current generator 10 is not shown in FIG. 1.

FIGS. 2 to 4 show the pole wheel 26 with its six claw poles 28 which are uniformly distributed over its circumference. In the present example, the pole wheel 26 and the claw poles 28 are produced from a single piece of magnetizable material, but they can also be assembled from several component parts. The pole wheel 27 with its claw poles 29 essentially corresponds to the pole wheel 26 with its claw poles 28. In the center of the pole wheel 26, a center hole 45 is located in which the rotor shaft 25 is secured in position; the securing is preferably effected by a knurled area 46 on the corresponding area of the rotor shaft 25 and additional caulked areas 47 between the edge of the centre hole 45 of the pole wheel 26 and the rotor shaft 25.

The claw poles 28 of the pole wheel 26, which are shown in FIGS. 2 to 4 and are essentially aligned in parallel with the rotor shaft 25, are basically V- or trapezoid-shaped in their longitudinal extent and, in this connection, have their greatest width in the disc-shaped area of the pole wheel 26. In the disc-shaped area of the pole wheel 26, the claw poles 28 also have their greatest thickness, that is to say the thickness of the claw poles 28 decreases towards their free ends. However, embodiment of the claw poles 28, however, deviations from this embodiment of the claw pole 28 are also possible. For example, claw poles of constant width and/or thickness or also claw poles of which the imaginary center lines do not extend in parallel with the rotor shaft 25 or form an obliquely angled triangle, trapezoid or rectangle in their longitudinal extent.

The outer surfaces 43 of the claw poles 28 and 29, pointing in the direction of the stator hole 21, are subdivided—seen in the direction of rotation D of the claw pole rotor 20—into a front area 48 which is closest opposite to the stator hole 21 and preferably describes the arc of a circle the radius of which is approximately at the center of the claw pole rotor 20; The front edge of the claw poles 28 and 29 can be constructed, if necessary, as slightly rounded or also as oval.

Two plane areas 50 and 51 then adjoin the front area 48 of the outer surface 43 of the claw poles 28 and 29—also seen in the direction of rotation D; the second plane area 51 ends at the rear edge 52 of the outer surface 43 of the claw poles 28 and 29. The two plane areas 50 and 51 extend in parallel with the rear edge 52 but exhibit a different inclination: the first plane area 50 forms a smaller angle $\alpha$ with respect to a tangent 53 applied to the front area 48 of the claw pole 28 or 29 than the second plane area 51, which encloses an angle $\beta$ with the tangent 53. In a preferred embodiment, $\alpha = 19$ degrees and $\beta = 38$ degrees; however, $\alpha$ can also be between 15 and 25 degrees and $\beta$ between 30 and 50 degrees, depending on the respective type of alternating-current generator. The width, measured in the circumferential direction D of the claw pole rotor 20, of the first plane area 50 is, for example, 4 millimeters and that of the second plane area 51, for example, 2 millimeters; the choice of the above widths of the plane areas 50 and 51 is also dependent upon the respective type of alternating-current generator.

Instead of two such plane areas 50 and 51, however, the claw poles 28 and 29 can expediently also have three such plane areas and, if necessary, also a few more, for optimising the noise reduction in other types of alternating-current generators. The essential feature is the planeness of these areas 50 and 51, as a result of which, in addition to the noise-reducing effect, further advantages can be achieved, namely the production of easily reproducible and inexpensive claw poles 28 and 29 and the avoidance of energy loss of the alternating-current generator as a consequence of the proposed measures.

FIG. 5 shows the pole wheel 26' of another alternating-current generator. In the pole wheel 26', the moulded-on claw pole 28' is designed in such a manner that the two plane areas 50' and 51' extend in parallel with the rotor shaft 25. The direction of rotation of this pole wheel 26' is identified by an arrow and by D.

In FIG. 6 another embodiment of a pole wheel 26'' is shown. In this pole wheel 26'', the plane areas 50'' and 51'' are again differently constructed, the plane area 50' extending in parallel with the rotor shaft 25 and the plane area 51'' of the claw pole 28'' extending in parallel with the rear edge 52'' of the claw pole 28''. In this example too the direction of rotation of the pole wheel 26'' is identified by means of an arrow and by D.

The angles of inclination $\alpha$ and $\beta$ of the plane areas 50', 50'' and 51' and 51'' in FIGS. 5 and 6 must be adapted to the noise and performance characteristics of the three-phase generator 10 on case basic by case.

I claim:

1. An alternating current generator, in particular a three-phase generator for electrical systems of motor vehicles, said alternating current generator comprising a metallic casing; a laminated stator located in the metallic casing and having a stator surface defining a stator hole and a plurality of slots formed in said surface for accommodating an alternating-current winding; a clawpole rotor is located coaxially in said stator hole and including a rotor shaft and a plurality of claw pole pairs uniformly distributed on a circumference of said claw pole rotor and fixed to the rotor shaft, said claw pole pairs extending substantially parallel to said rotor shaft, being arranged coaxially on said rotor shaft in spaced relationship relative to each other, and having outer surfaces which form an annular air gap with respect to the stator surface, each of said claw pole pairs consisting of two claw poles of different polarity, an outer surface of each claw pole having, in a direction of rotation of said claw pole rotor, a front area extending a first distance from said stator surface and a rear edge extending a second distance from said stator surface and which is greater than said first distance, said outer surface having a plurality of plane surface portions extending between said front area and said rear edge and transverse to a rotational plane of said claw pole rotor, at least one of said surface portions located closer to said rear edge forming with a tangent extending to said outer surface at a point where said air gap is smallest, a first angle which is greater than a second angle formed with the tangent by at least one of said surface portions located farther away from said rear edge.

2. An alternating-current generator as set forth in claim 1, wherein said plurality of plane surface portions comprises two plane surface portions.

3. An alternating-current generator as set forth in claim 1, wherein said plane surface portions extend substantially parallel to said rear edge.

4. An alternating-current generator as set forth in claim 1, wherein said plane surface portions extend substantially parallel to said rotor shaft.

5. An alternating-current generator as set forth in claim 1, wherein said claw pole rotor includes a plurality of disc-shaped pole wheels, said outer surface having substantially a V-shape with a greatest width thereof being located in an area of an associated pole wheel.

6. An alternating-current generator as set forth in claim 1, wherein said claw pole rotor includes a plurality of disc-shaped pole wheels, said outer surface having substantially a trapezoidal shape with a greatest width thereof being located in an area of an associated pole wheel.

7. An alternating-current generator as set forth in claim 1, wherein one of said plurality of plane surface portions extends parallel to said rotor shaft and another of said plurality of plane surface portions extends substantially parallel to said rear edge.

8. An alternating-current generator as set forth in claim 1, wherein said first angle is between 30 and 50 degrees and said second angle is between 15 and 25 degrees.

* * * * *